Patented Aug. 21, 1945

2,383,145

UNITED STATES PATENT OFFICE 2,383,145

CHEWING GUM BASE

Joe E. Moose, Anniston, Ala., assignor to Monsanto Chemical Company, St. Louis, Mo., a corporation of Delaware No Drawing. Application March 31, 1944, Serial No. 528,951

18 Claims. (Cl. 99—135)

This invention relates to a chewing gum and more particularly to a chewing gum base embodying a hydrocarbon material essentially comprising a mixture of terphenyls and a vinyl resin selected from the group consisting of polyvinyl acetate and polystyrene.

One object of the present invention is to provide an improved chewing gum.

Another object is to provide a chewing gum base and a chewing gum which is characterized by its stability to changes due to oxidation, the action of actinic light rays and changes in temperature.

Another object is to provide a product which is free from objectionable odor and taste and which readily assumes the proper degree of plasticity when chewed.

An additional object is to provide a product which has the proper degree of cohesiveness, resiliency and stretch and at the same time has a nice texture, a desirable dryness and a long chewing life.

A further object is to provide a product which is characterized by the fact that it does not stick to floors, clothes, furniture, etc., as chicle-base gum does.

A still further object is to provide a product which does not stick to the teeth and can, therefore, be chewed readily by people having false teeth.

Another object is to provide a composition which does not require the presence of a mineral filler to facilitate blending and to maintain the plasticizer in intimate contact with the base to overcome the objectionable taste of the plasticizer employed.

Other objects of the invention will be apparent to those skilled in the art as the description proceeds.

Chicle has been used extensively as a chewing gum base, but it is no longer available in the required amounts and it is also subject to the disadvantage that it is expensive and possesses a tacky nature which renders the gum containing it difficult to remove from an object on which it is deposited. Chicle is also objectionable because gums containing it are too soft and the trend of the public taste generally is in the direction of tougher gums.

In recent years various synthetic products have been developed and suggested for use as a chicle substitute and various materials have been combined with chicle to compensate for the shortage of this material and while some measure of success has been attained, the products have not been entirely satisfactory.

Polyvinyl acetate, for example, has been suggested as a chewing gum base, but it has not been a satisfactory substitute for chicle. It has many advantages over the latter, but unfortunately it possesses the tendency to stick to the teeth. To correct this objectionable property, it has been proposed to modify the polyvinyl acetate by the addition of sulfur and while this treatment apparently accomplishes the desired result it presents the disadvantage of blackening the gum making machinery.

It has also been proposed to use a mineral filler in the polyvinyl acetate composition to prevent the latter from sticking to the teeth. The disadvantage with this is that the mineral filler has a tendency to separate from the base as the gum is chewed with the result that the composition becomes gritty and, therefore, undesirable. Such a composition is also objectionable because unless a relatively high proportion of filler is employed to maintain the required amount of plasticizer in intimate contact with the polymer, the plasticizer imparts an undesirable taste to the product. To counteract the tendency of the mineral filler to separate from the polymer and to prevent the objectionable taste of the plasticizers from being carried into the mouth by the separation of the mineral filler, the addition of a material such as wax, fat or oil or a mixture of the materials has been suggested in Patent 2,288,100, to Shawinigan Chemicals, Limited. Such a product, however, is subject to the drawback that it requires relatively large amounts of the addition agent to accomplish the desired result and it is not possible with such large amounts of addition agent to effectively plasticize the product and at the same time avoid the undesirable taste of either the addition agent or the plasticizer or both. If the amount of filler employed is increased in an effort to obtain complete plasticization, then the product becomes crumbly and lifeless. On the other hand, if the amount of filler is reduced or left unchanged and the amount of addition agent is reduced, the product either becomes too plastic and sticks to the teeth or the disagreeable taste of the plasticizer is carried into the mouth by the separation of the mineral filler.

I have discovered that a blend of polymerized vinyl acetate or polystyrene and a hydrocarbon material essentially comprising a mixture of terphenyls produces an improved chewing gum base which has none of the objectionable features set forth above.

In compounding my improved chewing gum base I employ the terphenyl mixture produced as a by-product during the thermal synthesis of biphenyl from benzene. Such a by-product has been found to consist principally of ortho-terphenyl, meta-terphenyl and para-terphenyl together with substantial amounts of higher related hydrocarbons such as ortho-triphenylene, dibiphenyl and other unidentified hydrocarbon compounds.

In the recovery of biphenyl as produced by the above method a distillation is resorted to, the biphenyl being obtained from the pyrolysis product by carrying the distillation up to about 270° C. The residue after the biphenyl has been removed is composed of various complex higher boiling bodies herein referred to as polyphenyls. These complex hydrocarbon bodies or polyphenyls may be distilled at atmospheric pressure by further raising the temperature during distillation up to and above 410° C. Samples of these polyphenyls which were distilled at atmospheric pressure were found to have approximately the following average composition:

| | Per cent by weight |
|---|---|
| Ortho-terphenyl | 7.1 |
| Meta-terphenyl | 44.0 |
| Para-terphenyl | 20.0 |
| Related higher hydrocarbons (ortho-triphenylene, dibiphenyl, etc.) | Balance |

The above distillable fraction comprises approximately 80% of the total high boiling bodies, the remaining 20% being distillable in greater or less amount at less than atmospheric pressure.

The distilled high boiling fraction obtained in the manner described above is one of the constituents of my improved chewing gum base and for the sake of convenience it will be hereinafter referred to in the specification and claims as a "polyphenyl mixture."

Another important constituent of my chewing gum base is derived in the following manner from the distilled or undistilled high boiling residue obtained as a by-product in the thermal synthesis of biphenyl from benzene.

A quantity of biphenyl high boiler having approximately the following composition:

| | Per cent |
|---|---|
| Biphenyl | Trace |
| Ortho-terphenyl | 7.1 |
| Meta-terphenyl | 44.0 |
| Para-terphenyl | 20.0 |
| Higher related hydrocarbons | Balance | is charged into an atmospheric still provided with a short fractionating column to separate, first, a fraction boiling at a temperature up to say 250° C. to 260° C. This fraction will contain minor amounts of biphenyl which normally occur in the high boiling residues. The temperature of the still is then further raised to the range of about 330 to about 350° C., and a second fraction is thereby obtained consisting largely of ortho-terphenyl. This fraction comprises about 9% of the usual charge and is a mixture of from 80 to 97% or 98% ortho-terphenyl, the balance being meta-terphenyl containing a trace of para-terphenyl. This mixture of isomers has a melting point such that on raising the temperature thereof all of the crystals are liquid above 50° C. A fraction containing 97 to 98% ortho-isomer with 3% to 2% meta-isomer will melt above about 55° C. These isomeric mixtures are excellent plasticizing materials and they will be hereinafter referred to as the "ortho-terphenyl fraction" when describing the chewing gum and its method of preparation.

The hydrocarbon material which I blend with polyvinyl acetate or polystyrene to produce my chewing gum base is the product formed by combining the above described "polyphenyl mixtures" with the "ortho-terphenyl fraction." The composition of this product varies within rather wide limits depending upon the distillation conditions and the particular portion of the fractions selected. However, I have found that the best results are obtained when the "polyphenyl mixture" and the "ortho-terphenyl fraction" are combined with each other in such proportions as to yield a product having the following range of compositions:

| | Per cent by weight |
|---|---|
| Ortho-terphenyl | 8.7–15.5 |
| Meta-terphenyl | 40.0–44.3 |
| Para-terphenyl | 18.2–19.2 |
| Related higher hydrocarbons (ortho-triphenylene, dibiphenyl, etc.) | 26.3–27.8 |

Although the above description has been limited to terphenyl mixtures derived from the by-product of the thermal synthesis of biphenyl from benzene, it should be understood that mixtures of the above type produced synthetically or as the by-product of other chemical processes are within the scope of my invention.

The following are several examples of a chewing gum base made in accordance with the present invention:

Example I

| | Per cent by weight |
|---|---|
| "Polyphenyl mixture" | 76–80 |
| "Ortho-terphenyl fraction" | 4–7 |
| Polyvinyl acetate having a viscosity of 7 centipoises at 20° C | 12–15 |
| Paraffin | 0.5–4 |

Example II

| | Per cent by weight |
|---|---|
| "Polyphenyl mixture" | 80 |
| "Ortho-terphenyl fraction" | 6 |
| Polyvinyl acetate having a viscosity of 7 centipoises at 20° C | 12 |
| Paraffin | 2 |

Example III

| | Per cent by weight |
|---|---|
| "Polyphenyl mixture" | 79 |
| "Ortho-terphenyl fraction" | 8 |
| Polyvinyl acetate having a viscosity of 15 centipoises at 20° C | 12 |
| Paraffin | 1 |

Example IV

| | Per cent by weight |
|---|---|
| "Polyphenyl mixture" | 79 |
| "Ortho-terphenyl fraction" | 8 |
| Polyvinyl acetate having a viscosity of 7 centipoises at 20° C | 12 |
| Paraffin | 1 |
| Polishing material such as dicalcium phosphate | (1) |

[1] Up to 33% by weight of the base.

Example V

| | Per cent by weight |
|---|---|
| "Polyphenyl mixture" | 72–80 |
| Polystyrene having a viscosity of about 5.6 centipoises and an average molecular weight of about 75,000 | 11–13 |
| "Ortho-terphenyl fraction" | 7–10 |
| Fused congo | 2–5 |

Example VI

| | Per cent by weight |
|---|---|
| "Polyphenyl mixture" | 76 |
| Polystyrene having a viscosity of about 5.6 centipoises and an average molecular weight of about 75,000 | 12 |
| "Ortho-terphenyl fraction" | 8 |
| Fused congo | 4 |

The various ingredients of the chewing gum base may be intimately mixed with each other in any desired manner. One suitable method is to introduce the ingredients on the usual roll mill or in a Brandbury mixer whereupon incorporation of the several ingredients with one another is readily effected. The mixing is preferably carried out at an elevated temperature which brings about a more rapid intermingling and the production of a homogeneous product in which all of the constituents are thoroughly and intimately admixed with one another.

In preparing the chewing gum base, polyvinyl acetate having a viscosity substantially in the range of from 7 to 15 centipoises at 20° C. may be used, however, I prefer to employ polyvinyl acetate having a viscosity defined by the lower limit of the above range.

The viscosity of polyvinyl acetate depends on the degree of polymerization and is determined by dissolving the compound in benzene and in making it up so that at 20° C. one liter contains one molecular weight of the monomer in grams. This is filtered into the apparatus through cotton wool, precautions being taken to avoid loss of solvents. The time of outflow is then determined by the Oswald viscosimeter, which has been standardized on a pure solvent (benzene), of which the absolute viscosity is known in centipoises.

When preparing a chewing gum base containing polystyrene, a resin having the following physical properties may be employed, it being understood that it is also within the scope of my invention to use a polystyrene resin having a viscosity and an average molecular weight outside the ranges indicated.

| | Viscosity in dioxane —2% | Average [1] molecular weight |
|---|---|---|
| | Centipoises | |
| Polystyrene | 5.6 | 75,000 |
| Do | 6.9 | 90,000 |
| Do | 10.2 | 120,000 |

[1] Figured from the viscosity in dioxane.

The above viscosities and molecular weights are only approximately correct since batches are not consistent. Deviations from batch to batch may be ±5000 from the molecular weight listed.

For the most satisfactory results I preferably employ a polystyrene resin having a viscosity and molecular weight of the order of "Lustron A," that is, a viscosity of about 5.6 centipoises and an average molecular weight of about 75,000.

In general the composition of the chewing gum base should fall within the limits set forth in Examples I and V, but, if desired, it may fall outside thereof to meet specific requirements. For example, if a tougher gum is desired, this result is preferably attained by increasing the wax or fused congo content of the composition, but it may be accomplished by increasing the viscosity of the resin and/or by increasing the amount of the "polyphenyl mixture" employed.

If, on the other hand, a softer gum is desired, an increase in the content of the "ortho-terphenyl fraction," a decrease in the viscosity of the resin or a decrease in the quantity of the "polyphenyl mixture" employed will accomplish the desired result.

The presence of both the "ortho-terphenyl fraction" and the "polyphenyl mixture" is essential to obtain a base having the desired properties. If only the "polyphenyl mixture" is employed, the composition will be tough and incompletely plasticized with the result that the "polyphenyl mixture" will crystallize out of the composition in a relatively short time. If only the "ortho-terphenyl fraction" is employed, the composition will be too plastic. However, if these two materials are used in combination with each and in the proper proportions, the base will be effectively plasticized and there will be no separation of either the "ortho-terphenyl fraction" or the "polyphenyl mixture" from the base and the base will not be too tough or too plastic. It is thus apparent that the combination of the "ortho-terphenyl fraction" with the "polyphenyl mixture" produces a synergistic effect, that is, it produces an effect which is greater than the sum of the individual effects of the two materials.

While it is unnecessary to incorporate fillers in the chewing gum base to facilitate blending, it is within the scope of my invention to add them thereto and in Example IV I have specifically disclosed the use of dicalcium phosphate, which compound is a highly desirable addition agent because it is an efficient tooth polishing material. Other fillers, however, such as clay, infusorial earth, magnesium oxide, calcium carbonate, finely divided silica, talc, asbestine, carbon black, activated carbon, iron oxide pigment, yellow ochre, magnesium carbonate and calcium sulfate may be used if desired.

In place of paraffin other modifying compounds such as bees-wax, montan wax, candelilla wax, Japan wax, ceresin wax, carnauba wax, petrolatum, "Opal wax," ester gum, fused congo, "Piccolite" and coumar resin may be employed. The amount of wax or modifying material that may be incorporated with the base and still produce the desired result varies with the material added, but in general, and this is particularly true of paraffin wax, not more than about 5% should be used.

Suitable coloring material such as brown iron oxides may be added to the chewing gum base if desired.

To prepare chewing gum from the above compositions I combine powdered sugar, commercial corn syrup, flavoring and the chewing gum base with each other in approximately the following proportions:

| | Per cent by weight |
|---|---|
| Chewing gum base | 20 to 25 |
| Sugar | 45 to 60 |
| Syrup | 15 to 20 |
| Flavoring | 1 |

In order that those skilled in the art may even more fully appreciate the scope of the invention, several specific embodiments for carrying out the novel teachings of my invention are illustrated below, it being understood that these embodiments are illustrative and are in no way limitative of the scope of the invention. All percentages referred to are by weight.

Example VII

| | Per cent |
|---|---|
| "Polyphenyl mixture" | 20.0 |
| Polyvinyl acetate having a viscosity of 7 centipoises at 20° C | 3.0 |
| "Ortho-terphenyl fraction" | 1.5 |
| Paraffin | 0.5 |
| Karo syrup | 18.0 |
| Powdered sugar | 56.0 |
| Flavoring | 1.0 |
| | 100.0 |

Example VIII

| | Per cent |
|---|---|
| "Polyphenyl mixture" | 19.75 |
| Polyvinyl acetate having a viscosity of 15 centipoises at 20° C | 3.00 |
| "Ortho-terphenyl fraction" | 2.00 |
| Paraffin | 0.25 |
| Karo syrup | 18.00 |
| Powdered sugar | 56.00 |
| Flavoring | 1.00 |
| | 100.00 |

Example IX

| | Per cent |
|---|---|
| "Polyphenyl mixture" | 20.0 |
| Polyvinyl acetal having a viscosity of 7 centipoises at 20° C | 3.0 |
| "Ortho-terphenyl fraction" | 1.5 |
| Paraffin | 0.5 |
| Dicalcium phosphate | 12.0 |
| Karo | 18.0 |
| Powdered sugar | 44.0 |
| Flavoring | 1.0 |
| | 100.0 |

Example X

| | Per cent |
|---|---|
| "Polyphenyl mixture" | 19.0 |
| Polystyrene having a viscosity of about 5.6 centipoises and an average molecular weight of about 75,000 | 3.0 |
| "Ortho-terphenyl fraction" | 2.0 |
| Fused congo | 1.0 |
| Karo | 18.0 |
| Powdered sugar | 56.0 |
| Flavoring | 1.0 |
| | 100.0 |

As sweetening agents there may be employed powdered cane sugar, glucose syrup, invert sugar, honey, levulose, saccharin, chocolate syrup, etc. As flavoring material any of the known flavoring essential oils such as spearmint, wintergreen, peppermint, etc., licorice, vanilla and the like are suitable.

The chewing gum ingredients are intimately combined with each other by melting the base, introducing the molten base into a suitable mixer, for example, a Baker-Perkins mixer, adding the syrup, sugar and flavoring to the molten base and then mixing until the composition has reached the desired consistency. The plastic chewing gum mass thus formed is then extruded into slabs which are dusted with sugar, starch or other edible powder to prevent them from sticking to each other. The slabs are then fed into a sheeting machine to make stick gum or into another machine for rolling and cutting the gum into cubes for the production of candy-coated tablets of the "Chiclet" type. Other methods of incorporating the sugar, syrup and flavoring ingredients with the chewing gum base and of making the final product from the plastic chewing gum mass may be employed if desired.

The chewing gum prepared from the above compositions is non-gritty and is free from objectionable odor and taste and due to the fact that it retains its flavor well, it has a long chewing life. It has a nice texture and a desirable dryness and when chewed it has the proper cohesiveness, resiliency and stretch, that is, it is neither too lifeless nor too plastic. It is resistant to oxidation, the action of actinic light rays and changes in temperature. It is completely and homogeneously plasticized and hence the components thereof do not have a tendency to crystallize and separate from the gum composition. It is relatively non-tacky as compared with chicle gum and may be readily removed from clothes, floors, furniture, etc. without leaving a deposit of the gum thereon. Moreover, it does not stick to the teeth so that it may be chewed by people having false teeth.

Various modifications may be made in the invention without departing from the spirit thereof or the scope of the claims and, therefore, the above examples are to be considered as illustrative only and not in a limiting sense and only such limitations should be placed thereon as are imposed by the prior art or are specifically set forth in the appended claims.

I claim:

1. A chewing gum base comprising a terphenyl, a vinyl resin selected from the group consisting of polyvinyl acetate and polystyrene and a wax.

2. A chewing gum base comprising a terphenyl, and a vinyl resin selected from the group consisting of polyvinyl acetate and polystyrene.

3. A chewing gum base comprising a terphenyl, a vinyl resin selected from the group consisting of polyvinyl acetate and polystyrene, and a modifying material.

4. A chewing gum base including a hydrocarbon material essentially comprising a mixture of terphenyls, a vinyl resin selected from the group consisting of polyvinyl acetate and polystyrene, and a modifying material.

5. A chewing gum base including a hydrocarbon material essentially comprising a mixture of terphenyls, a vinyl resin selected from the group consisting of polyvinyl acetate and polystyrene, and a wax.

6. A chewing gum base including a hydrocarbon material essentially comprising a mixture of terphenyls, a polyvinyl acetate having a viscosity substantially in the range of from 7 to 15 centipoises at 20° C., and a modifying material.

7. A chewing gum base including a hydrocarbon material essentially comprising a mixture of terphenyls, and polystyrene.

8. A chewing gum base including a hydrocarbon material essentially comprising a mixture of terphenyls, and a polyvinyl acetate.

9. A chewing gum base including a hydrocarbon material consisting of an "ortho-terphenyl fraction" and a "polyphenyl mixture"; and a vinyl resin selected from the group consisting of polyvinyl acetate and polystyrene.

10. A chewing gum base including a hydrocarbon mixture consisting of an "ortho-terphenyl fraction" and a "polyphenyl mixture"; a vinyl resin selected from the group consisting of polyvinyl acetate and polystyrene; and a modifying material.

11. A chewing gum base including a hydrocarbon material essentially comprising a mixture of terphenyls, a vinyl resin selected from the group consisting of polyvinyl acetate and polystyrene, and paraffin.

12. A chewing gum base including a hydrocarbon material essentially comprising a mixture of terphenyls, a vinyl resin selected from the group consisting of polyvinyl acetate and polystyrene, and bees' wax.

13. A chewing gum base including a hydrocarbon material essentially comprising a mixture of terphenyls, a polyvinyl acetate, dicalcium phosphate, and a modifying material.

14. A chewing gum containing a terphenyl, and a vinyl resin selected from the group consisting of polyvinyl acetate and polystyrene.

15. A chewing gum including a hydrocarbon material essentially comprising a mixture of terphenyls, and a vinyl resin selected from the group consisting of polyvinyl acetate and polystyrene.

16. A chewing gum including a hydrocarbon material essentially comprising a mixture of terphenyls, a polyvinyl acetate, and a modifying material.

17. A chewing gum including a hydrocarbon material essentially comprising a mixture of terphenyls, a polystyrene, and a modifying material.

18. A chewing gum containing a terphenyl, a vinyl resin selected from the group consisting of polyvinyl acetate and polystyrene and a wax.

JOE E. MOOSE.

---

Certificate of Correction

August 21, 1945.

Patent No. 2,383,145.

JOE E. MOOSE

It is hereby certified that error appears in the printed specification of the above numbered patent requiring correction as follows: Page 4, column 1, line 28, Example IX, for "acetal" read *acetate*; and that the said Letters Patent should be read with this correction therein that the same may conform to the record of the case in the Patent Office.

Signed and sealed this 20th day of July, A. D. 1948.

[SEAL]

THOMAS F. MURPHY,
*Assistant Commissioner of Patents.* terphenyls, a vinyl resin selected from the group consisting of polyvinyl acetate and polystyrene, and paraffin.

12. A chewing gum base including a hydrocarbon material essentially comprising a mixture of terphenyls, a vinyl resin selected from the group consisting of polyvinyl acetate and polystyrene, and bees' wax.

13. A chewing gum base including a hydrocarbon material essentially comprising a mixture of terphenyls, a polyvinyl acetate, dicalcium phosphate, and a modifying material.

14. A chewing gum containing a terphenyl, and a vinyl resin selected from the group consisting of polyvinyl acetate and polystyrene.

15. A chewing gum including a hydrocarbon material essentially comprising a mixture of terphenyls, and a vinyl resin selected from the group consisting of polyvinyl acetate and polystyrene.

16. A chewing gum including a hydrocarbon material essentially comprising a mixture of terphenyls, a polyvinyl acetate, and a modifying material.

17. A chewing gum including a hydrocarbon material essentially comprising a mixture of terphenyls, a polystyrene, and a modifying material.

18. A chewing gum containing a terphenyl, a vinyl resin selected from the group consisting of polyvinyl acetate and polystyrene and a wax.

JOE E. MOOSE.

Certificate of Correction

Patent No. 2,383,145.    August 21, 1945.

JOE E. MOOSE

It is hereby certified that error appears in the printed specification of the above numbered patent requiring correction as follows: Page 4, column 1, line 28, Example IX, for "acetal" read *acetate*; and that the said Letters Patent should be read with this correction therein that the same may conform to the record of the case in the Patent Office.

Signed and sealed this 20th day of July, A. D. 1948.

[SEAL]

THOMAS F. MURPHY,
*Assistant Commissioner of Patents.*